May 21, 1957     L. F. BIRD     2,792,635
GAUGE FOR GLASS TUBING
Filed April 20, 1954

INVENTOR.
LESTER F. BIRD
BY
ATTORNEY

United States Patent Office 2,792,635
Patented May 21, 1957

2,792,635

GAUGE FOR GLASS TUBING

Lester F. Bird, Newark, N. J., assignor to Hanovia Chemical & Mfg. Co., Newark, N. J., a corporation of New Jersey Application April 20, 1954, Serial No. 424,371

1 Claim. (Cl. 33—178)

The present invention relates to a gauge for tubing and more particularly to a mechanical gauge for rigid tubing.

In the measurement of internal diameters of tubings or other hollow bodies, especially elongated hollow bodies, wherein it is desirable to determine the constancy of internal or bore dimensions, the use of conventional measuring devices has been inadequate in that rapid measurement is difficult and frequent re-settings of the measuring instruments are necessary. Otherwise, conventional measuring instruments are not, as a single device, adapted to speedily indicate the bore dimensions and irregularities, throughout the length of tubing within established or predetermined tolerances for such tubing.

Figure 1:
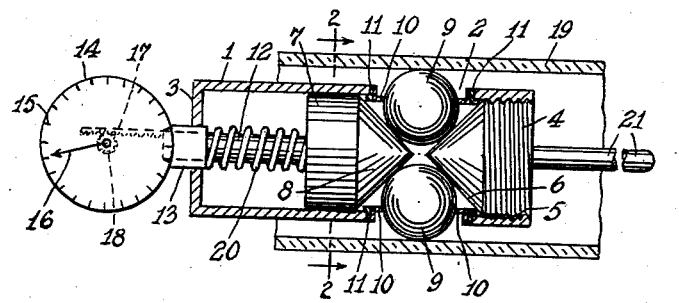
Figure 2:
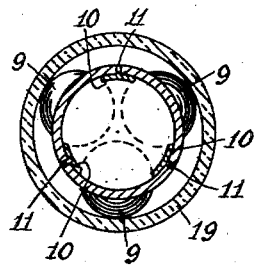

It is an object of the present invention to provide a gauge for tubing adapted to readily indicate bore dimensions and irregularities. It is a further object of the present invention to provide an automatically re-setting gauge for measuring bore diameters in tubings. It is a further object of the present invention to provide an automatically resetting mechanical gauge for measuring internal dimensions of transparent tubing along the entire length thereof. Other objects and advantages of the present invention will become apparent from the description hereinafter following and the drawings forming a part hereof, in which:

Figure 1 shows a partly elevational and partly cross-sectional view of the gauge of this invention, and Figure 2 shows a sectional view on a plane along lines 2—2 of Figure 1.

The present invention deals with a simple and readily applicable gauge for measuring the internal dimensions of tubing especially rigid tubing, whereby the entire length of tubing, or a part of such length, can be easily measured and simultaneously indicated even under longitudinal movement of the gauge within the tubing or movement of the tubing over the gauge, and whereby the gauge is automatically adjustable so as to follow the bore contours to produce an indication on a meter of any variations in the bore dimensions.

Referring to Figure 1, the gauge comprises a tubular frame 1, or generally a hollow frame, having a plurality of apertures 2 formed therethrough, preferably circular apertures, spaced circumferentially of said frame and having their centers in a common plane normal to the longitudinal axis of the frame. A centrally apertured closure member 3 is secured to one end of the frame 1, and a plug member 4 is secured inside the other end of the frame, e. g. by threaded engagement with the frame as at 5. The plug member 4 comprises a tapered surface 6 facing inwardly of the frame 1, e. g. a surface in the form of a cone or of a pyramid, or a right section thereof such as a bevel, with the apex thereof terminating or tending to terminate preferably at the longitudinal axis of the frame. Inside the frame 1 is a piston 7, or piston-like member, slideably engageable with the inner surface of the frame. The piston-like member 7 comprises a tapered surface 8, e. g. a tapered surface in the form of a cone or pyramid or a right section thereof such as a bevel, with the apex thereof terminating or tending to terminate preferably at the longitudinal axis of the frame and facing the tapered surface 6 and being complementary thereto in that the said tapered surfaces of the plug 4 and piston 7 provide for a channel between said plug and piston, said channel attenuating toward the longitudinal axis of the frame. A plurality of contact members 9 are disposed in said channel and in contact with the said surfaces 6 and 8 and each being operatively associated with an aperture 2, whereby said contact members protrude outwardly of said apertures beyond the perimeter or periphery of said frame. Preferably, the contact members are in the form of solid spheres. In order to contain the contact members 9 in contact with the said surfaces 6 and 8, a retaining means 10 is provided adjacent the apertures 2, e. g. in the case of spherical contact members, the retaining means is in the form of a collar having an inner diameter less than the diameter of the sphere. However, it is within the skill of the art to provide a retaining means of other form, e. g. abutment means functionally equivalent to said collar 10 in the case of contact members of a form other than said spheres, and the collar or other equivalent means are secured to the said frame by retaining member 11. Preferably, the spheres 9 are dimensioned so that they are not larger than one-half the diameter of the frame 1.

The piston 7 is provided with a shank 12 secured to the rear face thereof and extending longitudinally of the frame 1 and outwardly of said frame through collar 13, supported in and through the apertured closure member 3. The shank 12 slides within said collar axially thereof. Adjacent the closure member 3 is an indicator 14 having a calibrated face with calibrations 15 and a movable indicator arm 16 capable of traversing said face along the said calibrations. The indicator 14 comprises actuation means, for example, actuating means including a toothed arm 17 and a complementary cogwheel 18, said indicator being operatively associated with the cogwheel, and the arm 17 being connected to the shank 12 so that any longitudinal movement of the piston 7 is reflected in the movement of the indicator arm 16.

In operation, a tube 19 to be measured is caused to pass over the gauge whereupon the internal surface of the tube 19 contacts the protruding contact members 9. Normally, the spring 20 on the shank 12 maintains the cones in close axial spaced relation to each other so that the spheres 9 at all times contact a surface of both of said cones, and the spheres are in a normal condition of maximum protrusion as illustrated by Figure 2. The maximum protrusion being determined by the abutments 10. However, if the tube 19, which, for example is shown as a glass tube, has a diameter less than the maximum protrusion of the contact member, then the tube 19 will cause the contact members 9 to converge by moving toward the apex of each conical member 6 and 8 along the tapered faces thereof. The convergence of the contact members forces the piston 7 axially of the frame 1, and said movement of the piston is registered on the indicator 14 by the movement of the indicator arm 16 to a degree corresponding to the piston movement. Consequently, as the gauge is moved along the tube 19, any deviation in internal diameter of the tube is registered on the indicator 14. In the case of transparent tubes, e. g. glass tubes, a handle 21 may be employed to move the entire gauge through the tube.

The scope of this invention is intended to include modifications of the specific structure illustrated, wherein such modifications are functionally equivalent to the cooperating embodiments herein illustrated and described.

What I claim is:

A mechanical gauge for indicating the internal diameter of transparent glass tubing comprising a hollow substantially elongated frame, a plug member within one end of said frame, a piston-like member within said frame, said plug member and said piston-like member having tapered faces disposed toward each other, said piston-like member being movable axially of said frame, a plurality of apertures through said frame between said plug member and said piston-like member, a plurality of contact members each contacting the tapered faces of both said plug member and said piston-like member and projecting outwardly of said frame through said apertures, an indicator having a size not greater than the diameter of said frame, a shaft connecting said indicator and said piston-like member, means for maintaining said contact members in contact with said tapered faces, said tapered faces being axially separated from each other a minimum distance when the contact members protrude outwardly of said frame a maximum distance a rod-like handle member secured to said plug member, whereby the entire gauge is capable of insertion within said glass tubing.

References Cited in the file of this patent

UNITED STATES PATENTS

| | | |
|---|---|---|
| 2,519,221 | Bogen et al. | Aug. 15, 1950 |
| 2,591,452 | Maag | Apr. 1, 1952 |
| 2,665,496 | Wynne | Jan. 12, 1954 |

FOREIGN PATENTS

| | | |
|---|---|---|
| 85,267 | Sweden | Jan. 14, 1936 |
| 551,356 | Great Britain | Feb. 18, 1943 |
| 596,501 | Great Britain | Jan. 6, 1948 |